United States Patent [19]

Hammer et al.

[11] Patent Number: 4,871,791

[45] Date of Patent: Oct. 3, 1989

[54] PERMANENTLY PLASTICIZED, CELLULOSE-BASED PRODUCT

[75] Inventors: Klaus-Dieter Hammer, Mainz; Manfred Siebrecht, Wiesbaden; Hermann Winter, Wiesbaden-Biebrich, all of Fed. Rep. of Germany

[73] Assignee: Hoechst Aktiengesellschaft, Frankfurt am Main, Fed. Rep. of Germany

[21] Appl. No.: 177,974

[22] Filed: Apr. 5, 1988

[30] Foreign Application Priority Data

Apr. 6, 1987 [DE] Fed. Rep. of Germany ....... 3711571

[51] Int. Cl.$^4$ .......................... C08L 1/02; C08J 5/18; A22C 13/00
[52] U.S. Cl. ....................... 524/35; 524/36; 426/105; 426/106
[58] Field of Search ............. 524/36, 35, 37; 106/164; 536/60, 61; 426/105, 106

[56] References Cited

U.S. PATENT DOCUMENTS

| | | | |
|---|---|---|---|
| 3,168,409 | 2/1965 | Wellisch | 524/36 |
| 4,002,712 | 1/1977 | Hammer et al. | 264/194 |
| 4,066,584 | 1/1978 | Allen et al. | 524/36 |
| 4,097,623 | 6/1978 | Hammer et al. | 427/230 |
| 4,142,013 | 2/1979 | Hammer et al. | 428/36 |
| 4,198,325 | 4/1980 | Hammer et al. | 264/195 |
| 4,263,244 | 4/1981 | Allen et al. | 524/36 |
| 4,287,217 | 9/1981 | Hammer et al. | 426/105 |
| 4,399,255 | 8/1983 | Smith et al. | 524/36 |
| 4,529,634 | 7/1985 | Hammer et al. | 428/36 |

Primary Examiner—John Kight
Assistant Examiner—Nathan M. Nutter
Attorney, Agent, or Firm—Foley & Lardner, Schwartz, Jeffery, Schwaab, Mack, Blumenthal & Evans

[57] ABSTRACT

The cellulose-based product, in particular in the form of a film, contains in its wall a primary, permanent plasticizer of one or more crosslinked copolymers made from at least two components. One or more of these components are monomer units containing a terminal, ethylenically unsaturated, polymerizable group or compounds of maleic acid, or fumaric acid. A further component comprises units containing thermally crosslinked groups made from N-methylolamides of unsaturated carboxylic acids. A process is furthermore described for the production of this shaped product, in which the copolymer is metered into the viscose, and the N-methylolamide groups are thermally crosslinked with the cellulose.

15 Claims, No Drawings

PERMANENTLY PLASTICIZED, CELLULOSE-BASED PRODUCT

BACKGROUND OF THE INVENTION

The present invention relates to a cellulose hydrate-based product which is permanently plasticized by a primary plasticizer and optionally contains an additional secondary plasticizer. The product is preferably a film, in particular a tube. The invention furthermore relates to a process for the production of this product and the use thereof in the form of a fiber-reinforced film.

It is known that cellulose-hydrate shaped products are produced by the viscose process. The alkaline cellulose xanthate solution, generally known as the viscose solution, is extruded, for example, through a ring- or slot-shaped die, coagulated as cellulose hydrate gel using an acidic solution and regenerated to form cellulose hydrate. The properties of the regenerated cellulose product can be varied through the composition of the viscose and by incorporating additives. In the production of fiber-reinforced tubes, a tube-shaped fibrous material is coated outside and inside with viscose and treated in an appropriate manner with coagulation and regeneration liquid.

It is known that cellulose hydrate products become increasingly brittle and hard on storage due to loss of water and plasticizer. This phenomenon is due to crystallization taking place in the cellulose material, whereby formation of hydrogen bonds between the individual cellulose molecule chains, and thus convergence and spatial localization of the molecules, occur in the cellulose structure. This crystallization and structural modification process results in impairment, increasing with time, of certain physical properties, in particular the expansion, strength and swelling value of the product. In addition, it causes considerable shrinkage of the product, so that, in the case of tubular packages based on cellulose, a considerable increase in pressure on the enclosed product is stated.

This structural modification process, which proceeds gradually in cellulose hydrate products, and the associated disadvantageous embrittlement of the products, can scarcely be prevented by adding water-soluble, so-called secondary plasticizers. Although secondary plasticizers, such as, for example, glycerol, glycol or polyglycol, are able to improve the plasticity and grip of the product, they tend to migrate out of the product or are quantitatively dissolved out, in particular during washing as is customary in sausage casings made from this material before filling with sausage meat. This occurs because secondary plasticizers are not bonded to the cellulose hydrate molecules by chemical bonding, but instead only by intermolecular forces.

The consequence is particularly severe embrittlement of the plasticizer-free dried cellulose material. Sausage casings having an internal barrier layer, whereby the moisture from the sausage meat cannot pass into the cellulose layer, become shock-sensitive and tend to tear along their entire length when the sausage is first cut. It is therefore customary to briefly moisten the sausage with cold water before the first cut if it has a sausage skin of this type. However, this measure is not able to prevent the sausage meat bulging or even being forced out from the cut surface by the high internal pressure.

In order to avoid these disadvantages, it has also already been described to improve the flexibility of cellulose hydrate by adding, as so called primary plasticizers, chemical substances which are capable of cross-linking. See, e.g., German Offenlegungsschrift No. 2,362,551 = U.S. Pat. No. 4,002,712, and German Offenlegungsschrift No. 2,654,417 = U.S. Pat. No. 4,198,325. Primary substances which permanently plasticize the cellulose hydrate are taken to mean compounds which, in contrast to secondary platicizers, cannot be extracted with water and are fixed in the product. However, the known primary plasticizers are not as yet a satisfactory solution to the problem. One disadvantage of the known, non-extractable plasticizers is that the cellulose material has to contain very large amounts of these compounds in order to achieve an optimum effect. Due to the attendant marked impairment in the mechanical properties of the cellulose material, this process has hitherto not become established in practice.

Previous attempts have therefore also been made to prevent these disadvantages by applying an elastomeric plastic coating on the outside of the cellulose-based sausage casing (European Patent No. 0,001,545 = U.S. Patent No. 4,287,217). However, this coating only has the optimum effect when it has a weight of at least 5–8 $g/m^2$, i.e., when it is relatively thick. However, a weight per unit area of this magnitude should be avoided since a plastic coating of this type already forms a considerable outer barrier layer against water, so that problems occur on washing the sausage casing before the filling process, in particular when a barrier layer against water vapor and oxygen is provided on the inside of the casing. It has shown that coatings made from this elastomeric plastic tend to become detached from the cellulose surface when the sausage is boiled, so that an additional bonding layer is necessary to improve the adhesion. The application of this additional layer makes further process steps necessary and thus makes the product more expensive.

It is also known to employ the same outer coating in a considerably lower amount (80–500 $mg/m^2$) in the case of casings without a barrier layer (European Patent Application No. 0,100,056 = U.S. Pat. No. 4,529,634). This coating is intended to prevent enzymatic degradation of the cellulose by cellulytic enzymes, as can occur on storage of uncooked and salami-type sausages. However, it has been found that this coating does not exhibit an adequate action. In larger, more effective amounts, undesired reduction in the water-vapor permeability occurs, which delays drying and impairs maturing of the sausage.

SUMMARY OF THE INVENTION

It is therefore an object of the present invention to provide an improved cellulose-based product containing a suitable permanent plasticizer so that the use properties, in particular their strength, expansibility, swellability and the shrinkage behavior of the product, do not change adversely even after relatively long storage times.

A further object of the present invention is to provide an improved product which remains soft and flexible and does not become brittle after processing and during use, i.e. when the secondary plasticizer has been removed by the action of water.

Yet another object of the present invention is to provide a sausage product having improved drying and maturing properties.

It is a further object of the present invention to provide a process for making cellulose-based products having improved flexibility, strength and expansibility.

The present invention provides a cellulose-based product comprising a primary, permanent plasticizer which comprises at least one crosslinked copolymer. At least one of the components of the copolymer comprises monomer units containing a terminal, ethylenically unsaturated, polymerizable group or units of compounds of maleic acid or fumaric acid. A further component of the copolymer comprises polymerized units having thermally crosslinked groups. The present invention also provides a sausage product comprising a sausage meat filling surrounded by a sausage casing of fiber-reinforced cellulose, with the primary plasticizer being located in the cellulose.

To produce the cellulose-based products, from about 1 to 100% by weight of the copolymer which forms the primary plasticizer is added to viscose before extrusion. The viscose is extruded in the shape of the product and converted to cellulose hydrate gel by means of acidic coagulation and regeneration agents. The converted product is treated with secondary plasticizer. In a subsequent drying step, the thermally-crosslinkable groups of the copolymer which forms the primary plasticizer are crosslinked.

Sausages produced using the products of the invention as casings are easy to transport, i.e., without bursting, and to cut without splitting, even at relatively low relative atmospheric humidity. These improved mechanical properties are retained even when the proportion of the permanent plasticizer is relatively high, so that the product has the advantageous properties of cellulose and plastics in combination.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The shaped product of the invention has, for example, the form of fibers, but it is preferably in sheet or web form, which is taken to mean flat articles whose thickness is relatively small compared to the other two dimensions. Flat articles of this type are, e.g., sponge cloths, which are known for household cleaning purposes. Due to their porous structure, they have a high water-absorption capacity. Further flat articles are relatively thin packaging films, which are commercially available as cellulose films under the tradename Cellophane. In a further preferred embodiment, the shaped product is in a tube shape and is likewise used as a packaging covering, in particular for foodstuffs. In particular, the cellulose-based tube contains fiber reinforcement and is employed as a synthetic sausage casing, a so-called fiber skin, in sausage production.

The cellulose coating of the product contains, as a primary plasticizer, a specific copolymer or mixtures of these copolymers, and before processing also a customary secondary plasticizer, in particular glycerol, and water. The proportion of primary plasticizer may be within broad limits, in contrast to the permanent plasticizers known hitherto, and is from about 1 to 100%, preferably from about 5 to 90%, in particular from about 10 to 80% by weight, relative to the cellulose. The % by weight data given below for the permanent plasticizer always relate to the cellulose. The proportion of secondary plasticizer is from about 4 to 35%, in particular from about 12 to 20% by weight, and the water content is from about 6 to 30% by weight, in each case relative to the total weight.

The copolymers used in the invention are constructed from two or more components. At least one of these components is a monomer unit having a terminal, ethylenically unsaturated, polymerizable group, or maleic acid or fumaric acid compound, in particular the monomer units of group 1: methacrylate and/or acrylate units, preferably with ($C_1$–$C_8$)-alkanols, in particular butyl methacrylate or butyl acrylate units; and group 2: one or more components made from units containing several double bonds, such as a 1,3-diene, in particular butadiene, units of vinyl esters, in particular vinyl acetate, of vinyl ethers, in particular vinyl ethyl ether, of vinyl-aromatics, in particular styrene and vinyltoluene, of olefins, in particular ethylene, of unsaturated monocarboxylic acid or dicarboxylic acids and derivatives thereof, in particular methacrylic acid, acrylic acid, maleic acid, fumaric acid, itaconic acid, the monoesters or diesters thereof with ($C_2$–$C_6$)-alkanols or ($C_2$–$C_6$)-alkylenediols, the monoamides or diamides thereof, and the nitrile compounds thereof, in particular methacrylonitrile and acrylonitrile, each of these components preferably being present in the copolymer to the maximum extent of about 20 mol-%.

The major component preferably comprises methacrylate or acrylate units. The alcohol radical of the methacrylate or acrylate units preferably has 1 to 8, in particular 2 to 6, carbon atoms, such as, for example, ethyl methacrylate or acrylate, propyl methacrylate or acrylate or butyl methacrylate or acrylate, butyl (meth)acrylate being particularly suitable. The proportion of these ester units in the copolymer is, in particular, about 50 mol-% or more. Of the further units mentioned in group 2, the following are of particular importance: vinyl acetate, vinyl ethyl ether, styrene, vinyltoluene, ethylene, butadiene, methacrylic acid, acrylic acid and the amides thereof, the monoesters and diesters thereof with ($C_2$–$C_6$)-alkylenediols or -alkanols and/or the nitrile compounds thereof. Each of these is preferably only present in the copolymer to a proportion of about 20 mol-%, and of these (meth)acrylic acid and (meth)acrylonitrile are particularly preferred.

The further component of the copolymer according to the invention comprises polymerizable units containing crosslinkable groups which are thermally crosslinked during production of the product. This component, which is preferably present in the copolymer in a proportion of from about 0.5 to 20, in particular from about 2 to 10, mol-% preferably includes N-methylolamides of unsaturated carboxylic acids, such as, for example, N-methylol derivatives of amides of fumaric acid or itaconic acid, but in particular of acrylamide, methacrylamide and maleic monoamide or diamide. The N-methylol group is optionally etherified by an aliphatic alcohol having 1 to 8, preferably 1 to 4, carbon atoms. The thermal crosslinking of the N-methylol groups takes place in the cellulose layer.

Copolymers having this composition are known and commercially available as binders for non-woven fabrics.

By adding the copolymer to the cellulose layer, embrittlement of the material can be considerably reduced, in particular also when the shaped product, such as a tube-shaped packaging casing, has been stuffed with sausage meat and treated with hot water. The glycerol-free, shrunk casing which compresses the sausage meat under pressure exhibits a lesser tendency towards bursting on impact, in particular during transport, and towards edge tearing on cutting.

Surprisingly, the copolymer can be incorporated without problems as an aqueous dispersion into the alkaline viscose solution. It need only be ensured that the aqueous dispersion has a pH of greater than about 7.5 in order to prevent local precipitation of the viscose. The copolymer is readily compatible with the remaining components, in particular colored pigments, does not impair the casting behavior of the viscose, (i.e. does not cause problems during coagulation and regeneration of the cellulose), and is not washed out by the various treatment liquids. Neither, surprisingly, does it impair the mechanical properties of the finished casing material. This action may be attributable to the fact that the copolymer is particularly flexible and is crosslinked with itself and, presumably, also with the cellulose molecules.

Thes secondary plasticizer, in particular glycerol, is added in a conventional fashion when the coagulation and regeneration process is complete and before drying. The content of secondary plasticizer can be reduced without disadvantages with an increasing content of permanent plasticizer, as far as values of below about 15% by weight, relative to the total weight. It is also possible to vary the shrinkage of the sausage casing after simmering or boiling the sausage by adjusting the glycerol content. The greater the glycerol content in the sausage casing, the more the casing shrinks.

In order to produce a fiber-reinforced tubular casing which is suitable as a synthetic sausage casing, the permenent plasticizer is incorporated into the viscose, with which the tube-shaped fiber reinforcement is then coated. The coating can take place on the inside and/or outside of the fiber reinforcement. The further coagulation and regeneration steps are carried out in a customary manner. The subsequent drying process takes palce on the inflated tube at temperatures, in particular, of about 90° to 150° C., which are sufficient to carry out the thermal crosslinking of the N-methylolamides. As a synthetic sausage casing, the fiber-reinforced cellulose tube can have on its inside and/or outside the synthetic resin coatings which are necessary for the particular sausage type, for example, a barrier layer, comprised of a vinylidene chloride copolymer (PVDC), against water vapor, water and gases, in particular atmospheric oxygen, on the inside, or a cationic resin coating, in particular a water insoluble epichlorohydrin-polyamine polyamide resin coating, for improved adhesion of the sausage casing to the sausage meat on drying of the sausage.

The bursting pressure and the extension of the fiber-reinforced cellulose casing remain virtually unchanged even at a high polymer content of about 30 to 80% by weight. The swelling value, i.e., the water-absorption capacity, only decreases noticeably, usually up to about 25%, at a plastic content of above about 50%. The water and gas permeability is reduced by about 20 to 40%, and the glycerol absorption capacity by about 10 to 40%. Nevertheless, no disadvantageous effects are noticed during processing of the casing, in particular during filling and peeling, even at a high polymer content. On the contrary, the casing is given plastic properties. Thus, a considerably reduced tendency toward degradation of the cellulose by cellulytic enzymes and other microorganisms is achieved even at a relatively low content of the permanent plasticizer. This effect increases as the proportion of permanent plasticizer increases.

On the other hand, the toughness of the cellulose layer is greatly increased even at a low content of only about 3 to 10% by weight of copolymer and the susceptibility to bursting and the tendency toward edge tearing of the glycerol-free, shrunk material is significantly reduced, so that relatively small amounts of polymer are sufficient to eliminate this problem. The copolymer present in the cellulose layer reduces or prevents crystallization of the cellulose molecules.

A further advantage of the copolymer incorporated into the cellulose material is apparent during shirring of the tubular casing. The casing is particularly flexible and can be folded and pressed tightly together without problems. The filling properties are also considerably improved. The casing can readily be processed on automatic stuffing machines, exhibits no tendency toward bursting, and expands very uniformly when the sausage meat is forced in.

Sponge cloths provided with the copolymer likewise exhibit improved use properties and longer service lives. They have a higher tear resistance and flexibility, even in the dry state and after relatively long use, and reduced abrasion loss. They have reduced hydrophilia and thus also improved cleaning properties, which can be seen from a reduced formation of smears when glass surfaces are wiped. In addition, a reduced susceptibility toward microorganisms is also apparent here. In contrast, their good water-absorption capacity and water-retention capacity remain virtually unchanged.

The invention is illustrated in greater detail with reference to the examples below. The measurement of the tear propagation resistance and tendency towards edge tearing of the casing material is described in Example 1.

EXAMPLE 1

In order to illustrate the reduced tendency toward edge tearing of the cellulose films treated according to the invention, a cellulose fiber skin having a PVDC barrier layer inside is produced in which the tendency toward tearing in the untreated state occurs to a particularly great extent.

An aqueous dispersion containing 50% by weight of copolymer and having a pH of 8 is added to an alkaline viscose solution just before extrusion. The copolymer is a polyacrylate comprising mainly butyl acrylate units and to a small extent acrylonitrile units. In addition, methacrylamide units containing uncrosslinked N-methylol groups and small amounts of other copolymerized acrylic and methacrylic compounds are also present in the copolymer. The viscose solution contains about 7.5% by weight of this polyacrylate, relative to the cellulose present in the viscose solution. This proportion by weight of the polyacrylate, relative to the cellulose, remains virtually unchanged during the process and is also present in the final product.

A web-shaped fiber paper is curled to form a tube and provided on both sides with this modified viscose solution. The viscose-treated tube passes through the customary baths for coagulation and regeneration. A fiber-reinforced cellulose hydrate gel tube is passed through a glycerol bath so that the finished tube has a glycerol content of about 23% by weight, relative to the total weight.

An aqueous dispersion of a thermocrosslinkalbl, epichlorohydrin/polyamine polyamide-based resin, which forms, after drying, an anchoring layer for the PVDC barrier layer to be applied later is applied to the inside of the tube. During the subsequent drying process, the tube, in the inflated state, is passed through a drying channel at 120° to 150° C. for 5 to 10 minutes. Thermal crosslinking of the N-methylol groups of the polyacrylate in the cellulose and thermal crosslinking of the resin on the inside of the tube take place during this procedure. In a further step, the inside of the tube is provided in a customary manner with a PVDC dispersion in order to form the barrier layer, and the tube is re-dried.

The tear propagation strength of the fiber-reinforced cellulose casing is determined after extracting the glycerol with hot water and drying to a moisture content of 6 to 8%. Five rectangular samples are cut out of the casing in both the longitudinal and lateral directions. The measurement is carried out on the samples cut at one edge using a DIN 53 859, part 4, tensile testing machine. The tension rate is 100 mm/min. The tear propagation strength is about 18 to 20% higher than in a comparison tube which does not contain the permanent polyacrylate plasticizer.

The fiber-reinforced casing obtained is filled with sausage meat typical for simmering sausages. The sausage obtained is treated with hot water in a customary manner and cooled. Whereas spraying with water on the inside during cooling is essential in conventional sausages of these types due to the susceptibility to bursting of the customary cellulose fiber skins having a barrier layer on their inside, this measure can be omitted in the sausage casings according to the invention.

After a period of storage under extreme conditions (23° C., 50% relative humidity), which are otherwise not usual and lead to a very high tendency toward edge tearing of sausage casings having an internal barrier layer, a tendency toward edge tearing which is reduced by about 20 to 25% is determined compared to sausages having fiber-reinforced cellulose casings without permanent plasticizer. The tendency toward edge tearing is determined as follows: eight to ten sausages are cut transversely the lengths of the tears are determined, and a mean is formed.

In practice, the sausage can easily be divided into several individual pieces without the sausage casing tearing at the cut points. The pieces are wrapped using a second package and marketed as portion packs.

EXAMPLE 2

A fiber-reinforced cellulose casing having an internal barrier layer is produced analogously to Example 1. The content of polyacrylate is significantly increased and is 20% by weight, relative to the cellulose. The swelling value of the comparison material (without barrier layer, without polyacrylate) is 120%, and the casing provided with polyacrylate (without barrier layer) exhibits a reduced swelling value of 108%.

The tear propagation resistance of the glycerol-free casing (with barrier layer) is 30 to 35% above that of a comparison material (with barrier layer, without polyacrylate).

A sausage produced and stored analogously to Example 1 exhibits a tendency toward edge tearing which is reduced by 25 to 30% compared with sausages whose fiber-reinforced cellulose casing does not contain the copolymer of the invention.

EXAMPLE 3

A fiber-reinforced cellulose casing is produced analogously to the examples above. The content of polyacrylate is 30% by weight, relative to the cellulose. The swelling value of the tube obtained (without barrier layer) is 100%. The glycerol-free casing having a barrier layer exhibits a tear propagation resistance which is about 50% higher than in the case of a corresponding comparison material without polyacrylate in the cellulose coating. Sausage produced and stored analogously to Examples 1 and 2 exhibit a reduced tendency toward edge tearing of 40 to 45%.

EXAMPLE 4

The example below serves to show the improved resistance of the cellulose material against microorganisms due to the polyacrylate added to the cellulose coating. The tube produced has no barrier layer and is used as a sausage casing for salami-type sausages.

A fiber web curled to form a tube is impregnated only on the outside with the modified viscose solution of Example 1. The polyacrylate proportion is increased to 40% by weight, relative to the cellulose. The coagulation and regeneration take place in a customary manner, and the glycerol content is set at 11% by weight, relative to the casing weight.

Before drying, the fiber-reinforced cellulose hydrate gel tube is provided, as in the Examples above, on the nonviscosed inside with a resin dispersion based on epichlorohydrin/polyamine polyamide. The concentration is increased in order to obtain a doubled coating weight (about 60 mg/m$^2$). The resin impregnation sreves to form an internal coating for improved adhesion of the sausage casing to the sausage meat if the latter loses water and shrinks during drying of the sausage. The tube is dried as in the Examples above. It exhibits a tear propagation resistance which is increased by 50%.

The tubular casing is filled with sausage meat of the true salami type, and the sausage obtained is sealed on the outside with noble mold. The sausage is preserved by drying in air for a prolonged time (12°-14° C., relative humidity 70-85%), a weight loss in the sausage meat of 25 to 30% being measured after about 2 months. The cellulase and other cellulytic enzymes which separate during storage of noble mold have left the cellulose layer virtually unharmed. Degradation by cellulytic enzymes is reduced by 60%. The cellulose casing can be removed from the dried and shrunk sausage meat without tearing.

What is claimed is:

1. A cellulose-based synthetic sausage casing, comprising a fiber-reinforced, cellulose-based tube and, located in the cellulose, a primary, permanent plasticizer which comprises at least one crosslinked copolymer, wherein at least one of the components of said copolymer comprises monomer units containing a terminal, ethylenically unsaturated, polymerizable group or units of compounds of maleic acid or fumaric acid, and wherein a further component of said copolymer comprises polymerized units containing thermally crosslinked groups.

2. A product as claimed in claim 1, wherein the thermally crosslinked groups comprise N-methyl-olamides of unsaturated carboxylic acids.

3. A product as claimed in claim 1, wherein the major components of the copolymer comprise methacrylate and/or acrylate units.

4. A product as claimed in claim 3, wherein said acrylic ester units comprise ($C_1$-$C_8$)-alkanols.

5. A product as claimed in claim 4, wherein said acrylic ester units comprise butyl methacrylate or butyl acrylate units.

6. A product as claimed in claim 3, wherein the proportion of the major components in the copolymer is in total equal to or greater than about 50 mol-%.

7. A product as claimed in claim 3, wherein the copolymer is additionally comprised of from one or more components made from units containing plural double bonds, from units of vinyl esters, of vinyl ethers, of vinyl aromatics, of olefins, of unsaturated monocarboxylic acids or dicarboxylic acids and the monoesters or diesters thereof with ($C_2$-$C_6$)-alkanols or ($C_2$-$C_6$)-alkylenediols, monoamides or diamides thereof, or nitrile compounds thereof, each of these components preferably being present in the copolymer to the maximum extent of about 20 mol-%.

8. A product as claimed in claim 1, wherein the units containing thermally corsslinked groups comprise N-methylol derivatives of (meth)acrylamide, maleic monoamide or maleic diamide and/or of the amides of fumaric acid or itaconic acid, the N-methylol group being optionally etherified by a ($C_1$-$C_4$)-alkanol.

9. A product as claimed in claim 1, wherein the proportion of the component made from units containing thermally crosslinked groups in the copolymer is from about 0.5 to 20 mol-%.

10. A product as claimed in claim 1, wherein the proportion of primary plasticizer, relative to the cellulose, is from about 1 to 100% by weight.

11. A product as claimed in claim 1, further comprising a secondary plasticizer.

12. A product as claimed in claim 11, wherein said secondary plasticizer comprises glycerol.

13. A product as claimed in claim 1, wherein said sausage casing further comprises a synthetic resin coating on at least one of its inside and outside surfaces.

14. A sausage product comprising a sausage meat filling surrounded by a sausage casing as defined by claim 1.

15. A product as claimed in claim 7, wherein the copolymer contains units selected from vinyl acetate, vinyl ethyl ether, styrene, vinyltoluene, ethylene, butadiene, methacrylic acid, acrylic acid and the amides thereof, the monoesters and diesters thereof with ($C_2$-$C_6$)-alkylenediols or -alkanols and/or the nitrile compounds thereof.

* * * * *